June 30, 1936.  W. H. PECK  2,045,921
TELEVISION SYSTEM
Filed Dec. 7, 1931
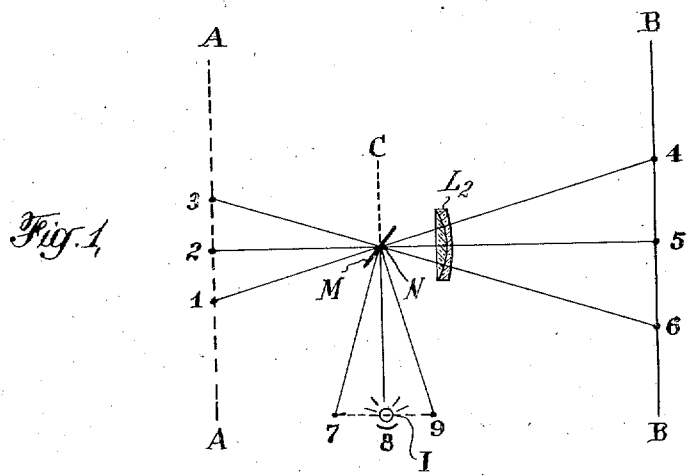
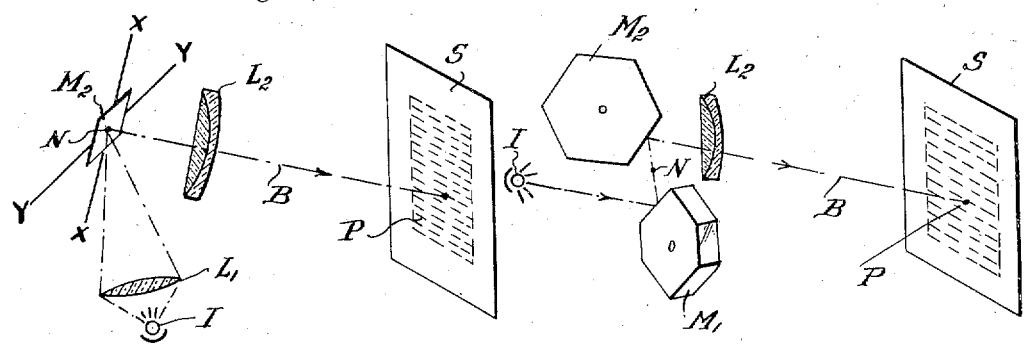
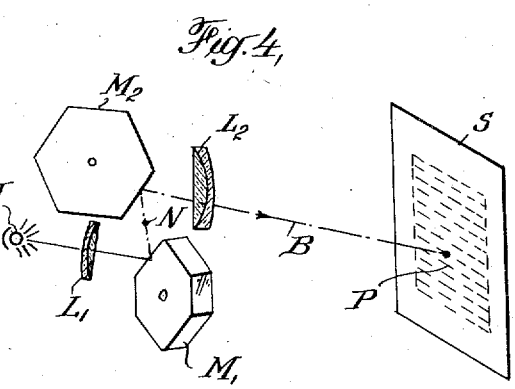
INVENTOR
William H. Peck,
BY
ATTORNEYS Patented June 30, 1936

2,045,921

UNITED STATES PATENT OFFICE 2,045,921

TELEVISION SYSTEM

William Hoyt Peck, Scarsdale, N. Y.

Application December 7, 1931, Serial No. 579,521

3 Claims. (Cl. 178—6)

This invention pertains to systems of image reproduction in television, more particularly to such systems of reproduction wherein the image is formed by projection upon a screen of a light beam variable both in intensity and in deflection corresponding to the image to be reproduced.

Such systems of this character as have heretofore come to my attention are objectionable owing to the low average illumination and inaccuracy of detail of the image. There are a number of causal factors responsible for this.

An elementary type of system is that wherein light is projected successively through helically disposed pin holes in a scanning disc rotatable past a rectangular aperture or diaphragm which defines the limits of the projected image.

Systems of this character are operated on the basis of about sixty lines per scan thereby dividing up the scanning area into about four thousand elements of equal area. As a result each area receives but one four thousandth of the total illumination falling within the aperture of the image defining diaphragm. An exceedingly intense light source is therefore required.

In addition to the low intensity the pin hole system necessarily produces a fuzzy, poorly defined spot of illumination upon the screen. The spot will moreover vary in contour, size and intensity as it travels across the screen due to the varying angle of impingement. All of these factors operate with cumulative effect upon image distortion.

Attempts have been made to improve the average illumination and image delineation by replacing the pin holes in the scanning disc with a corresponding number and arrangement of converging lenses provided upon one side with prism faces, focussing the light source in successively displaced transverse paths upon the screen.

This while an improvement on the pin hole arrangement neither uses light from the source efficiently nor eliminates image distortion. Light from the source must be admitted to the lenses at sufficient aperture to include at least two of them so that as one lens finishes its scanning strip the next can commence. The best that can be expected of this system, therefore, is a utilization of a maximum of twenty-five percent of the total illumination.

The lenses heretofore employed in such systems are of the simple plano-convex type, uncorrected for any of the various forms of aberration such as are technically designated by the terms spherical and chromatic aberration, coma, astigmation, unequal illumination, and curvature of the image field.

The effect of unequal illumination throughout the image is especially noticeable with the helically disposed lens system since a given lens is wholly illuminated during only about half of each scanning strip. As a consequence marked diminution in intensity occurs toward the edges.

Curvature of the field is that property, particularly present in a simple lens, whereby a flat field object does not form a flat but rather a curved field image. As a consequence with the scanning systems heretofore in use which employ a plane screen and simple lenses, the light beam becomes increasingly out of focus toward the limit of the image.

This has prohibited the use of efficiently constructed "wide angle" systems. An example of such a system would be one about two feet square formed on a screen situated about two feet from the lens, such as would provide convenient proportions for cabinet mounting in a television system for home use. With such an arrangement distortion due to curvature of the field becomes extreme.

I have devised a system of image reproduction which in simple and efficient fashion eliminates the objectionable feature above referred to as well as others. Broadly I accomplish these ends by employment of a plane screen and a stationary light source, a beam from which is variably deflected upon the screen by well known scanning devices, preferably, that comprising a pair of polyfaced mirror drums rotatable about mutually perpendicular axes, the one rotating rapidly to provide the horizontal scanning strips, and the other rotating more slowly to provide vertical displacement of the successive strips.

As a feature of my invention I interpose in the path of the deflected beam between the scanning mirrors and the screen, an anastigmatic or aplanatic lens adapted to focus a flat field image upon the screen. A lens of the type I have in mind I define as one which corrects for the various forms of aberration above referred to, including chromatic aberration where necessary. With an approximately monochromatic light source correction for chromatic aberration would of course not be required. A property of the type of lens I intend is that it will form a flat field image from a flat field object. The construction of anastigmatic or aplanatic lenses and lens systems are of course well understood in the art.

Since my system provides a flat field image from a stationary light source, it is necessary that the scanning means be so located and arranged as to simulate the conditions attendant upon the formation of such flat field image from a light source moveable in the object plane.

This I accomplish by utilization of an anastigmatic lens such as to have a nodal plane of emission in the space between the light source and the surface of admission of the lens. The nodal plane of emission of the lens or lens system is that plane which contains the nodal point about which the lens may be rotated without causing movement of the focussed image of a stationary object. I then so locate the scanning apparatus as to produce deflection of the scanning beam substantially in the nodal plane of emission of the lens.

By virtue of deflecting the scanning beam in the nodal plane of emission the image reproduced upon the plane screen corresponds identically with an image formed of a light source located in the object plane which varies in intensity and linear displacement in correspondence with the deflected beam. That is, at the screen, the image appears to be formed from a light source moving in the object plane.

As a consequence of this phenomenon the image formed by the lens will be a flat field image in the plane of the screen and will, moreover, be free from the various forms of aberration. Thus the moving beam will be sharply and properly focussed at all points of the screen, and distortion, unequal illumination, and like effects will be eliminated.

As an additional feature of my construction I may interpose between the light source and the scanning mirror a collecting lens for concentrating upon the mirrors the major portion of the total illumination, of an order exceeding sixty percent, providing thereby an image of high average illumination.

The collecting and anastigmatic lenses may be constituted portions of a compound lens system wherein the nodal plane of emission is located in the space between adjacent lens elements.

Having now described my invention generally, I refer for a more detailed explanation to the accompanying drawing of which:

Fig. 1 is a diagram illustrative of the principle upon which my invention operates; while Figs. 2, 3, and 4 are schematic representations of television image reproducing systems embodying my invention.

In Fig. 1 there is represented an anastigmatic lens $L_2$ of the type to which I have heretofore referred. This lens is so constructed that a flat field object in object plane A—A will be focussed by the lens into a flat field image in plane B—B.

Lens $L_2$ is of such construction that it will have a nodal point of emission N situated in a nodal plane C which lies in the space between the object plane and the surface of admission of the lens.

Assume now that a point source of light is situated in the object plane at 1. The pencil of rays passing through lens $L_2$ will be sharply focussed to a point image at 4. If now the light source in the object plane is moved from point 1 to 2 to 3, the focussed image in plane B—B will move from 4 to 5 to 6.

Owing to the flat field characteristic of the lens, the light source moving in the object plane will at all times be sharply focussed in the image plane, despite the fact that the light source moves at varying distances from the nodal point N and the image is focussed at varying distances from this point.

It will be noted further that as the light source moves in the object plane from 1 to 2 to 3, the pencils of rays focussed upon the image plane corresponding to the several positions, all intersect in the nodal plane C of emission of the lens as indicated by the lines 1—4, 2—5, and 3—6.

This circumstance furnishes a basis for duplicating the moving image 4—5—6 from a fixed light source I by means of a mirror $M_2$ pivotally mounted at the nodal point N of emission of the lens.

Assume the mirror initially positioned to deflect a beam from source I through the lens $L_2$ to the focal point 4 on the screen. In so far as the image is concerned this condition could be duplicated upon slight readjustment of the mirror by actually placing a light source at point 7 equal to the distance of point 1 from the nodal point I.

Assume now that the mirror is rotated so that the image formed of a beam deflected from fixed source I moves from 4 to 5 to 6. Instead of rotating the mirror we can attain the same result by maintaining the mirror fixed and actually moving the light source I from 7 to 8 to 9, the distances of which from the nodal point N correspond to the distances from N to points 1, 2 and 3 in the object plane respectively.

It will thus be apparent that an image formed by movement of a light source in the object plane A—A may be duplicated through the medium of a fixed light source I in conjunction with a deflecting mirror rotatable about the nodal point of emission of the lens. The important feature to bear in mind is that either arrangement will produce a sharply focussed flat field image in the plane B—B.

Fig. 2 shows an application of the above principle to image reproduction in a system of television. A source of light I is focussed by means of lens $L_1$ upon a small mirror $M_2$ rotating or oscillating with respect to the nodal point of emission N of an anastigmatic lens $L_2$. The mirror is positioned to deflect the focussed rays from source I through lens $L_2$ along path B upon a plane screen S.

In order to provide a scanning action so that the beam B will move in displaced parallel strips to form the image P, the mirror is arranged by any of the well known means to partake of a simultaneous rotation about two mutually perpendicular axes. That is, it rotates or oscillates rapidly about the axis X—X passing through the nodal point N, to provide horizontal scanning; while at the same time rotating or oscillating more slowly about the horizontal axis Y—Y to provide perpendicular scanning.

Due to this arrangement the beam from source I will always be deflected in the nodal plane of emission of $L_2$. The resulting flat field image P formed upon the plane screen S corresponds identically with a similar image that might be formed by moving a light source scanning fashion in an object plane situated to the left of the mirror.

In Fig. 3 scanning is accomplished by the well known arrangement of polyfaced mirror drums $M_1$ and $M_2$ rotating about mutually perpendicular axes to provide perpendicular and horizontal scanning. Light from source I is deflected in accordance with the dotted beam B from $M_1$ to $M_2$, thence through $L_2$ to the screen.

With the double mirror system of Fig. 3, it is impossible to provide for dual deflection of the beam exactly in the nodal plane of emission of the lens L₂. Accordingly the mirror drums M₁ and M₂ are placed as close together as practicable with the nodal point N of the lens located midway between them as illustrated.

Fig. 4 is a modification similar to Fig. 3 with the exception of the employment of a compound lens system L₁—L₂, one element of which is interposed between the light source and mirror drum M₁, while the other element L₂ is between the screen S and mirror drum M₂. The lens system is so designed that the nodal point of emission N will be situated in the space between lens elements and midway of drums M₁ and M₂.

As a practical proposition lens L₁ (Fig. 4) need not be a high grade anastigmatic lens such as is required for L₂. Rather it may be found preferable to employ a cheap condensing lens for this purpose as indicated in Fig. 2.

Some of the advantages of my system are the employment of but a single high grade lens which is stationary. Practically all of the light from the source is focussed into the scanning beam and thus provides an image of high average illumination. The image formed is a flat field or plane image which is free from the various forms of distortion caused by aberration. There is equal illumination throughout the field.

My system, it will be observed, is simple, practicable and economical of construction. It permits the formation of a well defined flat field image for exceedingly wide angles of aperture such as would produce marked distortion with other systems due to curvature of the field.

I claim:

1. In a system of television the combination of, a plane screen for receiving a projected image, a stationary light source, an anastigmatic lens constructed and positioned to provide a flat field distortionless image upon said screen, and means rotatable for deflecting approximately at the nodal point of emission of said lens, light from said source upon said screen.

2. In a system of television the combination of, a plane screen for receiving a projected image, a stationary light source, an anastigmatic lens constructed and positioned to provide a flat field distortionless image of light variably deflected from said source upon said screen, said lens having a nodal point of emission between said light source and the surface of admission of said lens, scanning means comprising a pair of light deflecting elements rotatable about mutually inclined axes for variably deflecting light from said source upon said screen, said elements being positioned as close together as practicable with said nodal plane of emission situated midway between the light deflecting surfaces thereof.

3. In a system of television the combination of a plane screen for receiving a projected image, a stationary light source, an anastigmatic lens constructed and positioned to provide a flat field distortionless image of light variably deflected from said source upon said screen, said lens having a nodal point of emission between said light source and the surface of admission of said lens, scanning means comprising a pair of light deflecting elements rotatable about mutually inclined axes for variably deflecting light from said source upon said screen, said elements being positioned as close together as practicable with said nodal plane of emission, situated midway between the light deflecting surfaces thereof, and a collecting lens interposed between said light source and said scanning means for concentrating light from said source thereupon.

WILLIAM HOYT PECK.